United States Patent
Salkintis

(10) Patent No.: US 8,285,279 B2
(45) Date of Patent: Oct. 9, 2012

(54) CAPABILITY UPDATE DURING CALL

(75) Inventor: Apostolis Salkintis, Athens (GR)

(73) Assignee: Motorola Mobility LLC, Libertyville, IL (US)

( * ) Notice: Subject to any disclaimer, the term of this patent is extended or adjusted under 35 U.S.C. 154(b) by 1051 days.

(21) Appl. No.: 11/624,731

(22) Filed: Jan. 19, 2007

(65) Prior Publication Data

US 2007/0254647 A1    Nov. 1, 2007

(30) Foreign Application Priority Data

Apr. 28, 2006    (EP) .................................... 06386008

(51) Int. Cl.
*H04W 4/00* (2009.01)
*H04W 36/00* (2009.01)

(52) U.S. Cl. .................. 455/432.2; 455/435.2; 455/436; 370/331

(58) Field of Classification Search ............... 455/432.2, 455/435.2, 432.1, 436; 370/331
See application file for complete search history.

(56) References Cited

U.S. PATENT DOCUMENTS

| | | | |
|---|---|---|---|
| 5,524,194 A | 6/1996 | Chida et al. | |
| 6,978,132 B1 * | 12/2005 | Sladek et al. | 455/432.2 |
| 7,187,923 B2 * | 3/2007 | Mousseau et al. | 455/416 |
| 2005/0041640 A1 * | 2/2005 | Nasielski et al. | 370/352 |
| 2007/0097879 A1 * | 5/2007 | Bleckert et al. | 370/254 |
| 2009/0010247 A1 * | 1/2009 | Stille | 370/352 |

FOREIGN PATENT DOCUMENTS

| | | |
|---|---|---|
| EP | 1248431 A1 | 10/2002 |
| EP | 1331785 A1 | 7/2003 |
| EP | 1370056 A1 | 12/2003 |
| EP | 1439725 A1 | 7/2004 |
| WO | WO 2005064958 A1 * | 7/2005 |
| WO | WO 2006052176 A1 * | 5/2006 |

OTHER PUBLICATIONS

3GPP, "3rd Generation Partnership Project Technical Specification Group Core Network and Terminals; Mobile Radio Interface Layer 3 Specification; Core Network Protocols" Mar. 2006, 3GPP TS 24.008, V7.3.0, Stage 3, Release 7, 534 pages, France.

3GPP, "3rd Generation Partnership Project Technical Specification Group Services and System Aspects; Combining Circuit Switched (CS) and IP Multimedia Subsystem (IMS) Services", Mar. 2006, 3GPP TS 23.279, V7.2.0, Stage 2, Release 7, 22 pages, France.

3GPP, "3rd Generation Partnership Project; Technical Specification Group Core Network and Terminals; Combining CS Calls and IMS Sessions", Mar. 2006, 3GPP TR 24.879, V7.0.0, Stage 3, Release 7, 73 pages, France.

3GPP, "3rd Generation Partnership Project; Technical Specification Group Core Network; Mobile Radio Interface Layer 3 Supplementary Services Specification", Dec. 2004, 3GPP TS 24.010, V6.0.0, General Aspects, Release 6, 31 pages, France.

* cited by examiner

Primary Examiner — Christopher M Brandt

(57) ABSTRACT

A capability update during a voice call between a first mobile device and a second mobile device. A communications link is configured between the first mobile device and the second mobile device to allow the first mobile device and the second mobile device to exchange a first type of data. The communications link is reconfigured to allow the first mobile device and the second mobile device to exchange concurrently both the first type of data and a second type of data.

11 Claims, 7 Drawing Sheets

CAPABILITY UPDATE DURING CALL

FIELD

The present application relates generally to mobile communications, and more particularly to mobile communications devices that operate on multiple networks.

BACKGROUND

In mobile communications, the term "combinational services" refers to the combining of traditional voice call services with additional services, such as video sharing, file sharing, multimedia messaging, and the like, which enhance the overall user experience. Not all networks, however, support combinational services. For instance, a Universal Mobile Telecommunications (UMTS) network will support IP Multimedia Subsystem (IMS) services, whereas a Global System for Mobile Communications (GSM) network will not. Therefore, when a mobile device on a UMTS network engages in a call with a mobile device on a GSM network, the call is limited to a voice call.

It is commonplace, however, for devices to roam across networks. A device can begin a call on one type of network and then roam outside of its network coverage area and be handed off to another network. When this occurs, a device's capabilities can change. If a device on a GSM network moves to a UMTS network, then it is moves from a network that is not capable of supporting combinational services to a network that is capable of supporting combinational services. Nevertheless, mobile devices combinational are only set up at the beginning of a call. Therefore, a device moving from a GSM network to a UMTS network, during a call, will not be able to utilize combinational services because they were not set up at the beginning of the call. Accordingly, what is needed is a system and method to provide a capability update during a call.

SUMMARY

In one embodiment, a method is provided. A first mobile device and a second mobile device are provided. A call is set up between the first mobile device and the second mobile device through configuration of a communications link that allows the first mobile device and the second mobile device to exchange a first type of data. A capability update is provided between the first device and the second device, during the call, when at least one of the first device and the second device become capable of supporting a second type of data. The communications link is reconfigured to allow the first mobile device and the second mobile device to exchange concurrently both the first type of data and a second type of data.

In one embodiment, the capability update is provide by sending a message indicating that the at least one of the first device and the second device is capable of supporting the second type of data. In one embodiment, the first mobile device is provided on a first network and the second mobile device is provided on a second network, wherein at least one of the first network and the second network only supports the first data type. The capability update is provided in response to a hand over of at least one of the first mobile device and the second mobile device to a network that supports the second data type.

In one embodiment, a circuit-switched (CS) voice call is set up between the first mobile device and the second mobile device. The communications link is reconfigured by setting up a combination CS voice call and packet switched (PS) call between the first mobile device and the second mobile device. In one embodiment, setting up the combination CS voice call and packet switched call comprises enabling the first device and second device to concurrently exchange at least one of multimedia messaging service (MMS) data and IP Multimedia Subsystem (IMS) data.

In one embodiment, a method is provided. A call is engaged in with a mobile device during which a first type of data is exchanged. A capability update is provided to the mobile device, during the call, in response to a change in capabilities, which allows the exchange of a second type of data. The first type of data and the second type of data are exchanged with the mobile device during the call.

In one embodiment, the call is engaged in while on a first network. Another network is moved to which supports the second type of data. A message is sent to the mobile device that the other network supports the second type of data. In one embodiment, a user information message is sent that is formatted in accordance with section 9.3.31 of the 3GPP TS 24.008 specification. In one embodiment, an IMS video session is set up with the mobile device prior to exchanging the first type of data and the second type of data. In one embodiment, MMS messages are exchanged with the mobile device. In one embodiment, a CS voice call is set up with the mobile device and voice data is sent to the mobile device. A combination CS voice call and PS call with is set up with the mobile device thereafter.

In one embodiment, a mobile device is provided. The mobile device includes an interface to a communications network and a processor. The processor is configured to set up a call with another mobile device during which a first type of data is exchanged, to provide a capability update to the mobile device, during the call, in response to a change in capabilities, which allows the exchange of a second type of data, and to exchange the first type of data and the second type of data with the mobile device during the call.

In one embodiment, the processor is configured to set up the call with the other mobile device while on a first network and to send a message over the interface to the other mobile device indicating that the second network supports the second type of data. In one embodiment, the processor generates the message to include a user information message that is formatted in accordance with section 9.3.31 of the 3GPP TS 24.008 specification. In one embodiment, the processor is configured to set up the call by setting up a CS voice call with the other mobile device and is further configured to set up a combination CS voice call and PS after sending the capability update.

In one embodiment, the processor is adapted to exchange MMS messages with the mobile device after the capability update. In one embodiment, the processor is adapted to register with an IMS server and exchange IMS messages with the mobile device after the capability update.

BRIEF DESCRIPTION OF THE DRAWINGS

For the purpose of facilitating an understanding of the subject matter sought to be protected, there are illustrative embodiments in the accompanying drawing, from an inspection of which, when considered in connection with the following description and claims, the subject matter sought to be protected, its construction and operation, and many of its advantages should be readily understood and appreciated

DETAILED DESCRIPTION

Figure 1:
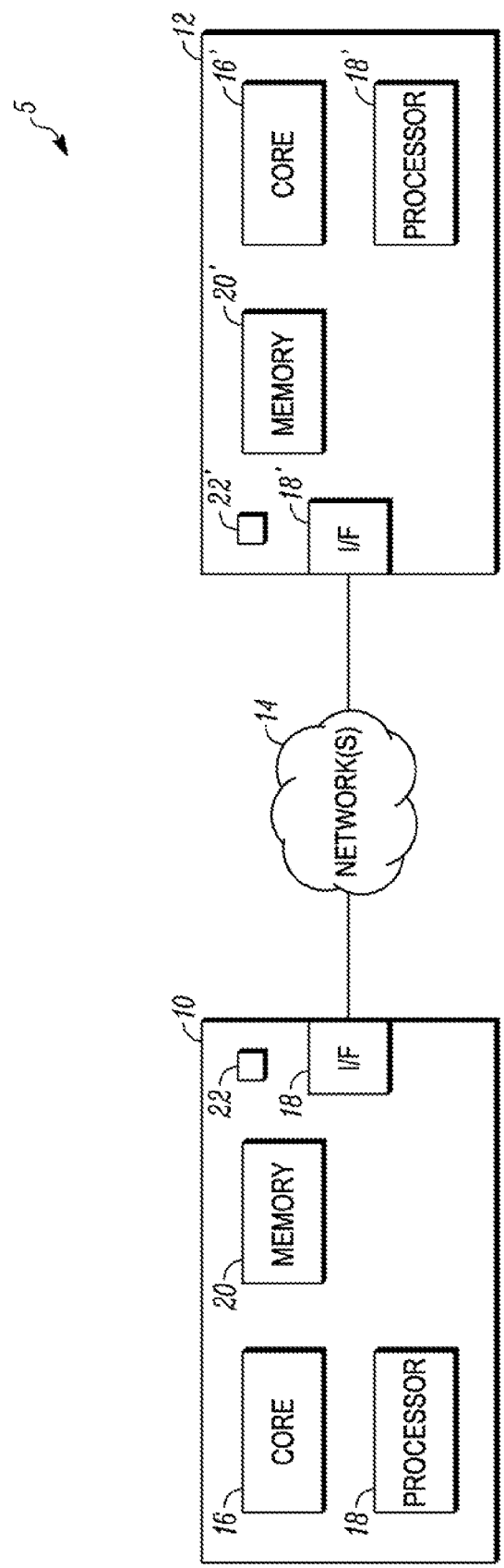
FIG. 1 depicts a system including a first mobile device and a second mobile device connected through at least one network.

Referring to FIG. 1, a system 5 includes a first device 10 and a second device 12. In one example, the first device 10 and the second device 12 are mobile communications devices that communicate with each other and with other devices (e.g. personal computers, laptops, personal digital assistants ("PDAs"), a mobile telephones, media servers, media players, workstations, file servers, mainframes, and so on) across at least one network 14. In other examples, devices 10, 12 are one or more removable components of the aforementioned devices or a combination of these devices.

Network 14 in one example is a radio access network. In another example, network 14 is any network that allows devices 10, 12 to communicate with each other or to other devices (e.g., a Local Area Network ("LAN"), a Wide Area Network ("WAN"), a wireless LAN, a wireless WAN, the Internet, a wireless telephone network, etc.). In a further example network 14 is a combination of any of the preceding network types.

An exemplary description of devices 10, 12 will now be provided for illustrative purposes. These descriptions are included to describe one example of a system and environment for providing a capability update. These descriptions in now way should be taken as limiting the scope of the claims to devices meeting the description of devices 10, 12 provided herein. Many different devices with different configurations can perform the capability update set forth herein.

Referring further to FIG. 1, each device 10, 12 includes a plurality of components such as computer software and/or hardware components. A number of such components can be combined or divided. An exemplary component of each device 10, 12 employs and/or comprises a series of computer instructions written in or implemented with any of a number of programming languages, as will be appreciated by those skilled in the art. For ease of description, FIG. 1 depicts the first device 10 and the second device 12 as having the same components. It should be understood, however, that devices 10, 12 can be different from each other without departing from the scope of inventions set forth herein.

Referring further to FIG. 1, each device 10, 12 includes a core 16, 16', at least one processor 18, 18', an interface 19, 19' and a memory 20, 20'. Core 16, 16' refers to device specific hardware and/or software components that assists each device 10, 12 in performing its core function(s) (e.g. mobile phone, PDA, etc.). For example, if device 10 were a mobile phone, then possible elements of core 14 would be a microphone, speakers, user interface, display, and related software and hardware. Processors 18, 18' control each device and perform device specific operations and functions for each device. Each device could include a single processor or multiple processors. Interfaces 19, 19' connect each device 10, 12 to network 14. In one example, interfaces 19, 19' are RAN interfaces, which connect devices 10, 12 to one or more RAN networks. Memories 20, 20' provide storage on which devices 10, 12 can store data (e.g. software, digital media, etc.).

In one example, each device 10, 12 employs at least one computer-readable signal-bearing medium 22, 22'. One example of a computer-readable signal-bearing medium 22, 22' is a recordable data storage medium such as a magnetic, optical, and/or atomic scale data storage medium. In another example, a computer-readable signal-bearing medium is a modulated carrier signal transmitted over a network coupled to the device 10, 12. Each computer-readable signal-bearing medium 22, 22' can be used to store software and/or logic components that are employable to carry out the capability update methodology described herein.

Figure 2:
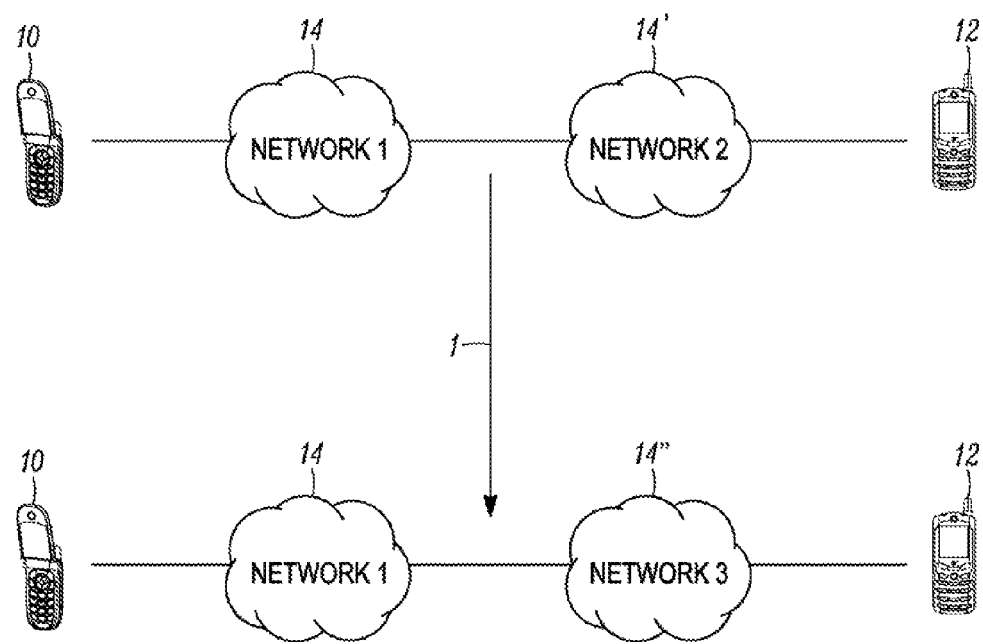
FIG. 2 depicts the first mobile device and the second mobile device of FIG. 1 connected thorough a first network and a second network and connected through the first network and a third network after handoff of the second device to the third network.
Figure 2A:
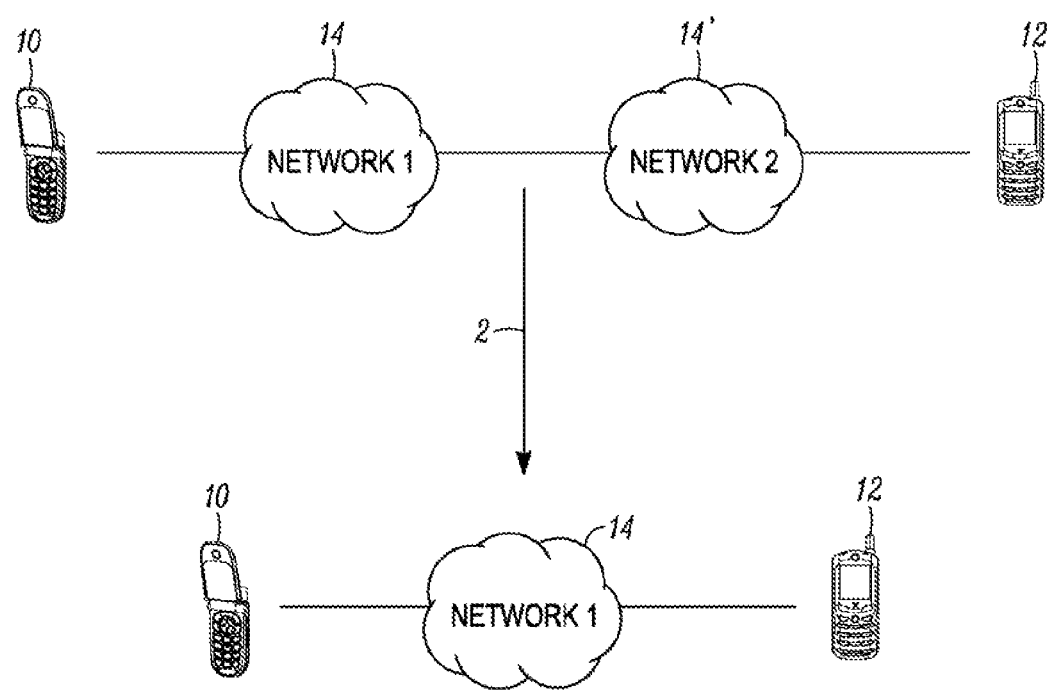
FIG. 2A depicts the first mobile device and the second mobile device of FIG. 1 connected through the first network and the second network of FIG. 2 and connected through the first network only, after hand off of the second device to the first network.

FIGS. 2 and 2A depict two exemplary situations in which a capability update can be implemented. In FIG. 2, devices 10, 12 are engaged in a circuit switched voice call while device 10 resides on network 14 and device 12 resides on network 14'. Network 14 supports combinational services whereas network 14' does not. In one example network 14 is a UTMS network and network 14" is a GSM network. Consequently, device 10 and device 12 can only engage in a voice call.

As shown by following the arrow designated as "1", device 12 is eventually handed off, e.g. because of roaming, to another network 14". Network 14" supports combinational services. Accordingly, device 12 sends a capability update to device 10 during the middle of the voice call. The capability update informs device 10 that device 12 can engage in combinational services.

The second example, shown in FIG. 2A, is similar to the first. The difference being that device 12, instead of moving to the other network 14", roams to network 14, which is the same network on which device 10 resides. Because network 14 supports combinational services, device 12 sends a capability update message to device 10 informing device 10 that device 12 can now engage in combinational services. The preceding examples are shown for illustrative purposes only and are not meant to limit the scope of the subject matter claimed herein.

Figure 3:
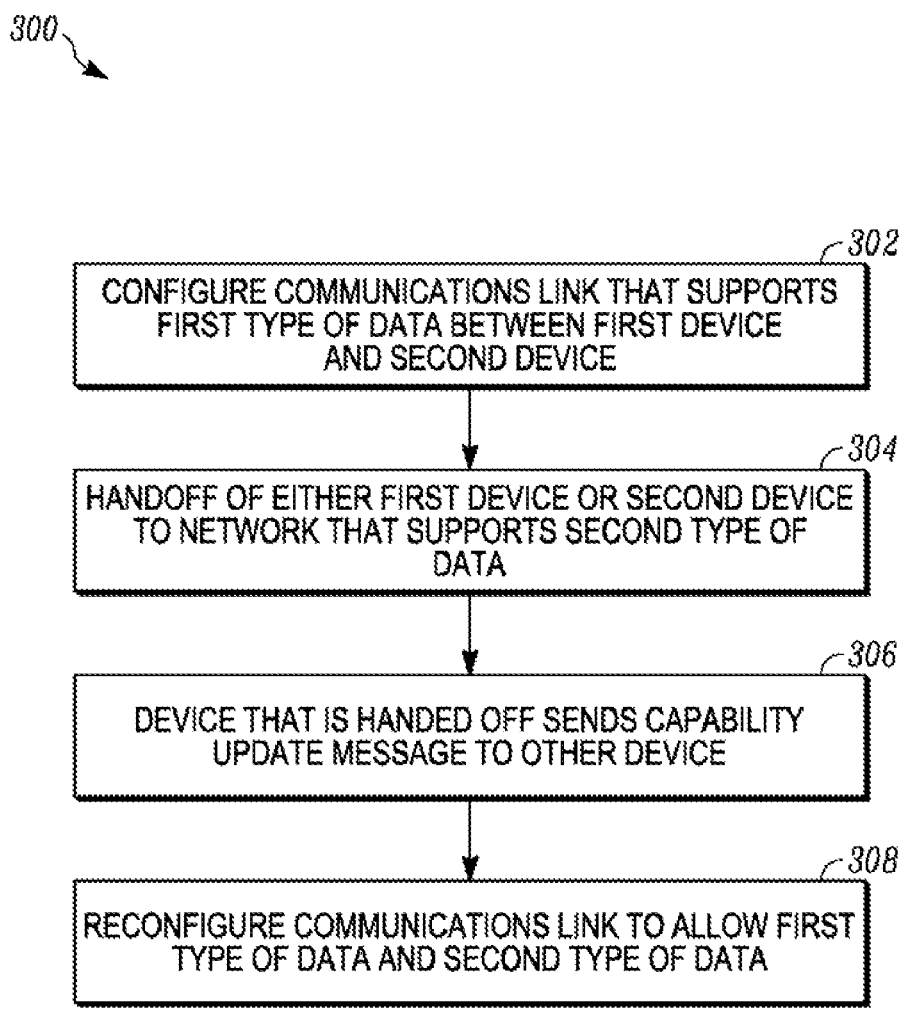
FIG. 3 is a flowchart outlining a methodology for performing a capability update during a voice call between the first mobile device and second mobile device of FIG. 1.

Referring to FIG. 3, an exemplary process 300 is shown during which devices 10, 12 update each other as network capabilities change. The first device 10 and the second device are each provided by their respective users on a network. In step 302, a communications link is configured in which allows the first device 10 and the second device 12 to the first device 10 and the second device 12 to exchange a first type of data. In one example, the communications link is a call that is initiate by device 10 calling device 12 or vice versa and the call is a circuit switched (CS) voice call. As will be discussed further herein, one aspect of the devices 10, 12 setting up the call is to exchange radio environment capability (REC) messages. In one example, processors 18, 18' generated within the REC messages and transmit them over interfaces 19, 19'. For instance, the processor 18 of device 10, through receipt of signals through interface 19, might ascertain that it is present on a UTMS network and device 12, through receipt of signals through interface 19' might ascertain that it is on a GSM network. The processors 18, 18' might then refer to data in memories 20, 20' which informs the devices processors that UTMS networks are cable of combinational services and GSM networks are not. The processors 18, 18' will then generate REC messages and send them over interfaces 19, 19'.

In step 304, one of the devices 10, 12 is handed off to another network. In one example, device 12 is connected to a GSM network, and then, as a result of roaming, moves to a UMTS network. Device 12 is then handed off to the UMTS network.

In step 306, the second device 312 initiates reconfiguration of the communication link between the first device 10 and the second device 12 by sending a capability update message to the first device 10. In one example, the capability update message is an REC update message that informs the first device 10 that device 12 is on a network capable of supporting combinational services. For instance, the REC update message might inform device 10 that device 12 is now on a network capable of handling combined CS and PS services.

In step 308, the communications link between the first device 10 and the second device 12 is reconfigured in response to the second device 12 moving to another network. In one example, the second device 12 moves to a network capable of supporting PS services. The communication link is reconfigured to allow the devices 10, 12 to exchange CS and PS data concurrently. Thus, a combinational services call is set up between the first device 10 and the second device 12. In one example, the combinational service call is set up in accordance with 3GPP standards and in particular with TS 23.279 and TR 24.879, which are hereby incorporated by reference.

As an alternative, it should be noted, that the first device 10 and the second device 12 could be engaged in a PS call while one type of network. If, for instance, device 10 moved to another network, which only supported CS data, then device 10 would send a notification to device 12 that it could only support CS calls. Accordingly, the communication link would then be reconfigured to allow device 10, 12 to exchange CS data.

Figure 4:
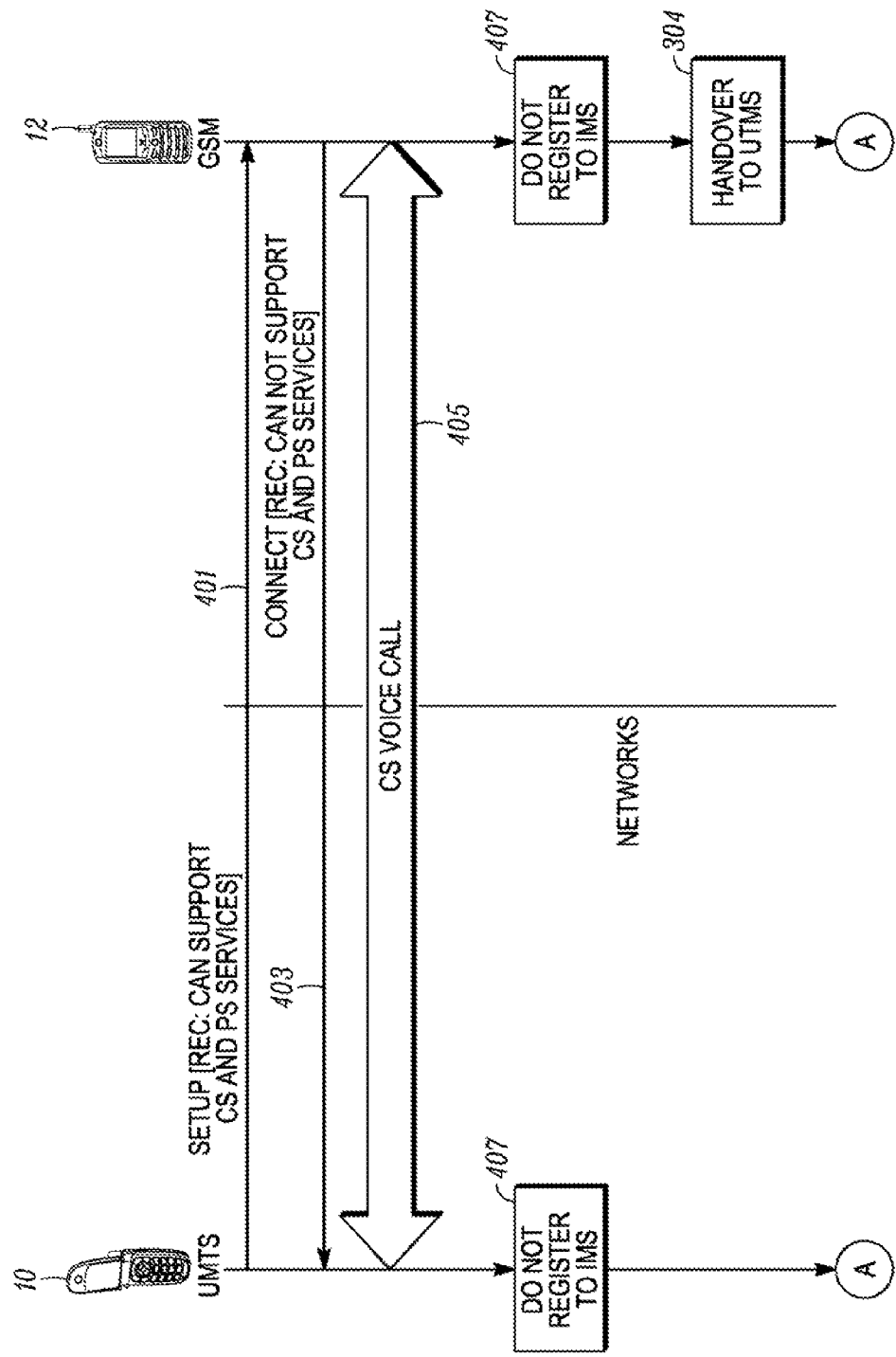
FIG. 4 is a diagram depicting one embodiment the setting up and connecting of a CS voice call in the methodology shown in FIG. 4.

Referring to FIG. 4, an exemplary description of step 304 in which a communication link is configured between the first device 10 and the second device 12 is now provided for illustrative purposes. In one example, a first type of call is set up between device 10 and device 12 while device 10 resides on a UTMS network and device 12 resides on a GSM network. Device 10 initiates a call by sending a "Setup" message 401 to device 12. The setup message 401 in one example includes a REC message that informs the second device 12 that the network on which the first device 10 resides is a network that can handle both CS and PS services. The second device 12 responds by sending a "Connect" message 403 to the first device 10. The Connect message 403 informs device 10 that the network on which the second device 12 resides can not support both CS and PS services. A CS voice call 405 is setup between the first device 10 and the second device 12, and because both devices can not support combinational services, the first device 10 and the second device 12 do not register, as shown by boxes 407, for PS services, such as IMS. During the voice call 405, the second device roams to a UMTS network is handed over, in accordance with step 304, to it. Flow then progresses to FIG. 5.

Figure 5:
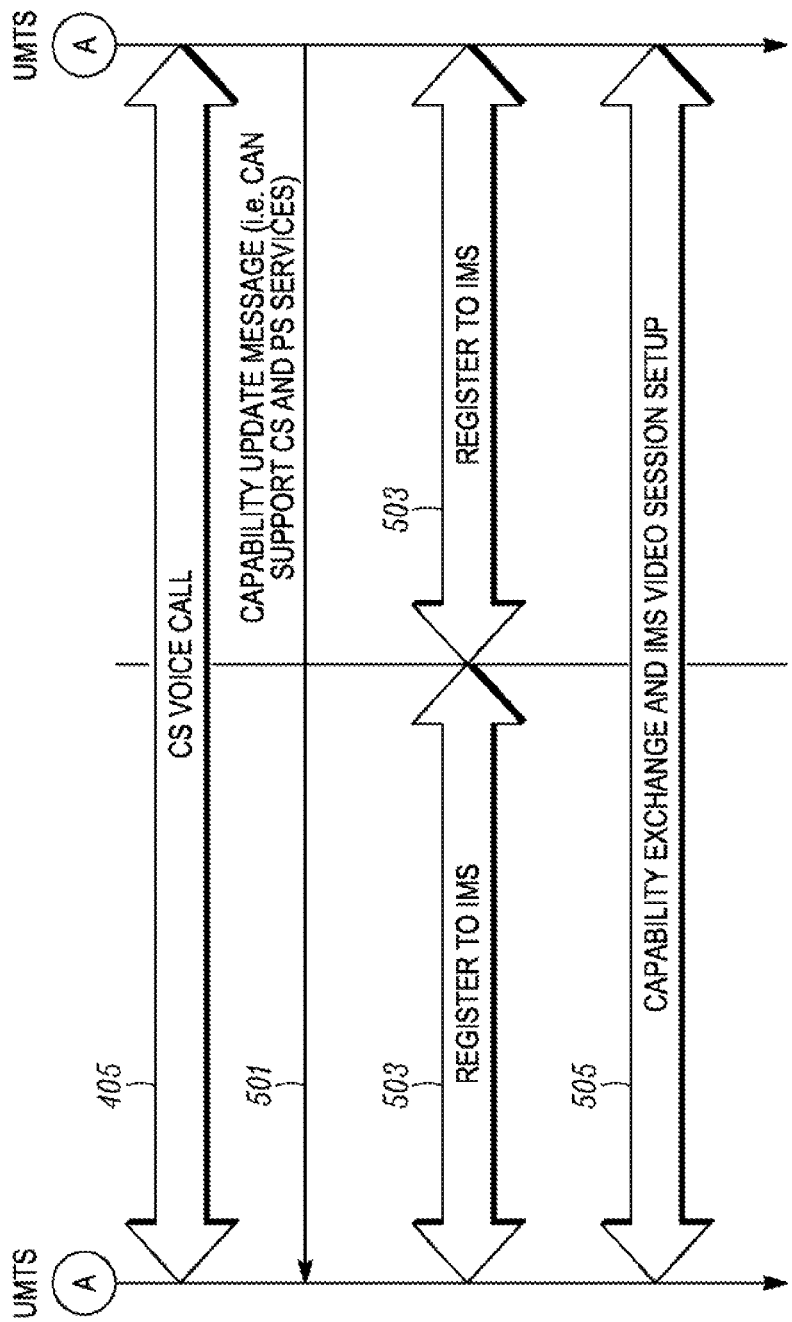
FIG. 5 is a diagram depicting one embodiment of performing a capability update and the setting up of a combinational service call as provided in the methodology shown if FIG. 4.
Figure 6:
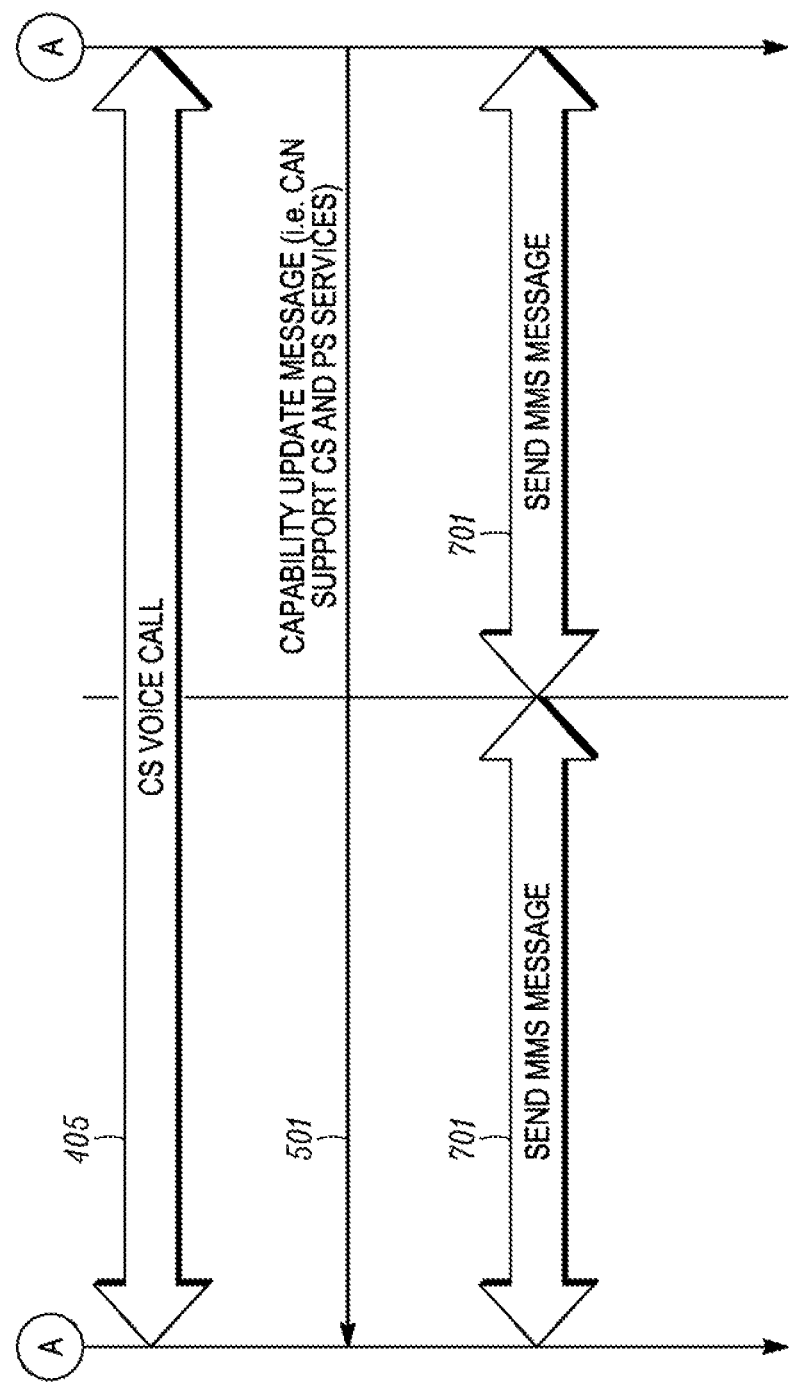
FIG. 6 is a diagram depicting one embodiment of performing a capability update and the setting up of a combinational service call as provided in the methodology shown in FIG. 4.

Referring to FIG. 5, after roaming to a UMTS network, device 12 sends a capability update message 501 to device 10. In one example, the capability update message 501 is an REC update message that informs device 10 that device 12 resides on a network that can support both CS and PS services. The first device 10 and the second device 12 then, in step 503, register for IMS services, and, in step 505, perform capability exchange and IMS video session setup. Referring to FIG. 6, in another example, instead of registering for IMS services, the devices 10, 12 utilize another PS service, such as MMS. Accordingly, the first device 10 and the second device 12 send MMS messages 701 to each other.

An embodiment of a capability update message is now provided for illustrative purposes. In one example, the capability update message is formatted in accordance with section 9.3.31 of the 3GPP TS 24.008 specification, which is hereby incorporated by reference. Section 9.3.31 provides in part for

[A] message is sent by the mobile station to the network to transfer information to the remote user. This message is also sent by the network to the mobile station to deliver information transferred from the remote user. This message is used if the user-to-user transfer is part of an allowed information transfer as defined in 3GPP TS 24.010.

This user information message is used by device 10 or device 12, in the middle of a CS call, to send an indicator, which passes transparently through the network. In accordance with the REC update described herein, two additional indicators are sent through utilization of the user information message: They are a "Simultaneous CS and PS Support" message and a "No Simultaneous CS and PS support" message. When a device has an ongoing call and its RECs change (e.g. when a GSM to UMTS handover takes place), the device can send a user information message to the mobile device to which it is connected to update the remote party with its current RECs (i.e. "Simultaneous CS and PS Support" or "No simultaneous CS or PS support").

While particular embodiments have been shown and described, it will be apparent to those skilled in the art that changes and modifications may be made without departing from the principles set forth herein. The matter set forth in the foregoing description and accompanying drawings is offered by way of illustration only and not as a limitation.

The invention claimed is:

1. A method, comprising:
   providing a first mobile device on a first network and a second mobile device on a second network, wherein the first network supports Circuit Switched (CS) and Packet Switched (PS) data, and the second network supports only CS;
   setting up a call between the first mobile device and the second mobile device through configuration of a communications link that allows the first mobile device and the second mobile device to exchange CS data;
   providing a capability update message from the second device to the first device, during the call, in response to a hand over of the second mobile device to a network that supports CS data and PS data, wherein the capability update message indicates to the first mobile device that the second mobile device is on a network capable of supporting both CS data and PS data;
   reconfiguring, during the call, by the first and second mobile devices after providing the capability update message to the first mobile device, the communications link to allow the first mobile device and the second mobile device to exchange concurrently both CS data and PS data, wherein reconfiguring after providing the capability update message includes registering the first and second mobile devices for PS services.

2. The method of claim 1, wherein the step of providing a capability update message comprises:
   sending a message indicating that the at least one of the first mobile device and the mobile second device is capable of supporting PS data.

3. The method of claim 1, wherein the step of reconfiguring comprises:

setting up a combination CS voice call and PS call between the first mobile device and the second mobile device.

4. The method of claim 3, wherein the step of setting up the combination CS voice call and PS call comprises:
enabling the first mobile device and second mobile device to concurrently exchange at least one of multimedia messaging service (MMS) data and IP Multimedia Subsystem (IMS) data.

5. The method of claim 1, wherein the step of exchanging concurrently CS data and PS data includes:
exchanging MMS messages between the first mobile device and the second mobile device.

6. The method of claim 1, wherein the step of setting up the call comprises:
setting up a CS voice call between the first mobile device and the second mobile device.

7. The method of claim 1, wherein the capability update message sent from the second mobile device to the first mobile device passes transparently through the network.

8. A mobile device, comprising:
an interface to a first communications network that supports only Circuit Switched (CS) data; and
a processor; wherein the processor is configured to set up a call with another mobile device interfaced to a second communications network that supports CS data and Packet Switched (PS) data, during which CS data is exchanged, to provide a capability update message to the another mobile device, during the call, in response to a hand over of the mobile device to a network that supports CS data and PS data, wherein the capability update messages indicates to the another mobile device that the mobile device is on a network capable supporting both CS data and PS data during the call, wherein the process is further configured to setup a combination CS and PS call after providing the capability update message, wherein setting up a combination CS and PS call after sending the capability update message includes the processor being configured to register the mobile device for PS services.

9. The mobile device of claim 8, wherein the processor is configured to set up the call by setting up a CS voice call with the other mobile device and is further configured to set up a combination CS voice call and PS call after providing the capability update message.

10. The mobile device of claim 8, wherein the processor is adapted to exchange MMS messages with the other mobile device after providing the capability update message.

11. The mobile device of claim 8, wherein the processor is adapted to register with an IMS server and exchange IMS messages and media with the mobile device after providing the capability update message.

* * * * *